US012129074B2

(12) United States Patent
Kovatch

(10) Patent No.: US 12,129,074 B2
(45) Date of Patent: Oct. 29, 2024

(54) FOOD CONTAINER STACKING DEVICE

(71) Applicant: David M. Kovatch, North Olmsted, OH (US)

(72) Inventor: David M. Kovatch, North Olmsted, OH (US)

( * ) Notice: Subject to any disclaimer, the term of this patent is extended or adjusted under 35 U.S.C. 154(b) by 38 days.

(21) Appl. No.: 17/689,555

(22) Filed: Mar. 8, 2022

(65) Prior Publication Data

US 2022/0281638 A1 Sep. 8, 2022

Related U.S. Application Data

(60) Provisional application No. 63/299,178, filed on Jan. 13, 2022, provisional application No. 63/158,052, filed on Mar. 8, 2021.

(51) Int. Cl.
*B65D 21/02* (2006.01)

(52) U.S. Cl.
CPC ...... *B65D 21/0224* (2013.01); *B65D 2203/02* (2013.01)

(58) Field of Classification Search
CPC .. B65D 25/24; B65D 71/0096; B65D 57/003; B65D 21/0224; B65D 2203/02; A47J 47/14; A47J 47/16
See application file for complete search history.

(56) References Cited

U.S. PATENT DOCUMENTS

| | | | | |
|---|---|---|---|---|
| 3,635,361 A * | 1/1972 | Hayes | ................ | B65D 21/0224 206/510 |
| 3,648,849 A * | 3/1972 | Harris | ................ | B65D 21/0224 211/126.5 |
| 3,791,552 A * | 2/1974 | Hayes | ................ | B65D 21/0224 206/502 |
| 4,913,290 A * | 4/1990 | deGroot | ............ | B65D 71/0096 206/821 |
| D583,615 S * | 12/2008 | Simon | ............................. | D7/354 |
| 7,905,353 B2 * | 3/2011 | Baker | ...................... | B65D 1/28 206/370 |
| 7,909,191 B2 * | 3/2011 | Baker | ..................... | B65D 51/00 220/23.4 |
| 8,887,943 B1 * | 11/2014 | Miller | .................... | A47G 19/02 220/573.1 |

(Continued)

FOREIGN PATENT DOCUMENTS

| | | | | |
|---|---|---|---|---|
| DE | 202007011002 U1 * | 12/2007 | ......... | B65D 21/0201 |
| GB | 2259906 A * | 3/1993 | ......... | B65D 21/0224 |

OTHER PUBLICATIONS

International Search Report and Written Opinion for Application No. PCT/US22/19337 dated Jul. 8, 2022, 10 pgs.

(Continued)

*Primary Examiner* — Patrick D Hawn
(74) *Attorney, Agent, or Firm* — Wegman Hessler Valore

(57) ABSTRACT

A food storage container stacking device includes a main body having a top surface and a bottom surface, a pair of ends and a pair of sides that define a perimeter of the top surface and the bottom surface. A lip extends from one end of the main body, the lip being oriented substantially perpendicular to the main body. The main body defines a central opening and a peripheral top support surface and a peripheral bottom support surface between the perimeter and the central opening.

15 Claims, 17 Drawing Sheets

(56) References Cited

U.S. PATENT DOCUMENTS

| | | | |
|---|---|---|---|
| 9,027,755 B2* | 5/2015 | Jones | B65D 21/0224 |
| | | | 206/503 |
| 9,434,507 B2* | 9/2016 | Blay Orenga | B65D 9/12 |
| 9,510,699 B1 | 12/2016 | Miller | |
| 10,596,729 B2* | 3/2020 | Viancin | A21B 3/136 |
| D934,022 S * | 10/2021 | Sarnoff | D7/359 |
| D945,813 S * | 3/2022 | Zhaobo | D7/354 |
| 11,571,091 B2* | 2/2023 | Charles | A47J 47/16 |
| 2001/0019060 A1 | 9/2001 | Zank | |
| 2006/0027106 A1 | 2/2006 | Craig et al. | |
| 2012/0305440 A1* | 12/2012 | Jaegers | B65D 21/0224 |
| | | | 206/564 |
| 2015/0291311 A1* | 10/2015 | Meza Cabello | B65D 21/083 |
| | | | 206/427 |
| 2016/0157676 A1* | 6/2016 | Difante | A47J 47/14 |
| | | | 126/33 |
| 2019/0283952 A1* | 9/2019 | Pawlick | B65D 81/3438 |
| 2022/0160170 A1* | 5/2022 | Casey | A47J 36/34 |
| 2022/0194657 A1* | 6/2022 | Frankenberg | B65D 71/04 |

OTHER PUBLICATIONS

International Search Report and Written Opinion of International Application No. PCT/US2022/019337 filed Mar. 8, 2022, 8 pages.

* cited by examiner

FOOD CONTAINER STACKING DEVICE

CROSS REFERENCE TO RELATED APPLICATIONS

This application claims the benefit of U.S. Provisional Application No. 63/158,052, filed Mar. 8, 2021, and U.S. Provisional Application No. 63/299,178, filed Jan. 13, 2022, the entireties of which are hereby incorporated by reference.

FIELD OF THE INVENTION

Aspects of the disclosed technology relate to devices for the efficient storage and stacking of food containers, and, more particularly, to a food container stacking device.

BACKGROUND

It is a common practice in restaurants, institutions and other commercial settings to prepare large quantities of food in advance of actual meal times and place the food in pans, which are stored in refrigerators until the food is to be served. The pans, which tend to be of standard sizes and configuration throughout the food service industry, cannot be stacked one on top of the other because the bottom of one pan would come into contact with the food in the pan below. The pans may be stacked perpendicularly, but this takes up an excessive amount of space in refrigerators and on countertops, and potentially provides an unstable storage arrangement.

BRIEF SUMMARY

Aspects of the disclosed technology relate to a food stacking device configured to be employed in connection with food storage containers. The stacking device facilitates food storage containers, such as food storage pans, of identical or nearly identical configuration to be placed in a resting position one on top of another for neat, efficient storage during periods of non-use, without requiring the additional use of a rack or other device which rests on a floor or shelf.

One aspect of the disclosed technology relates to a food container stacking device that includes a main body having a top surface and a bottom surface, a pair of ends and a pair of sides that define a perimeter of the top surface and the bottom surface; and a lip extending from one end of the main body, the lip being oriented substantially perpendicular to the main body. The main body defines a central opening and a peripheral top support surface and a peripheral bottom support surface between the perimeter and the central opening.

According to one feature, the peripheral top and bottom support surfaces have an approximately uniform width.

According to one feature, the perimeter of the top and bottom surfaces of the main body corresponds substantially with a perimeter of an upper flange rim of a food container with which the stacking device is employed.

According to one feature, the central opening has a perimeter that is smaller than a perimeter of a food container with which the stacking device is employed.

According to one feature, the lip extends downwardly relative to the main body.

According to one feature, the lip has a height of no more than about two inches.

According to one feature, the lip has a height no more than about 80% of a height of a food container on which the stacking device is disposed.

According to one feature, the lip includes an outer surface configured to receive indicia related to contents of a food container on which the stacking device is disposed.

According to one feature, the lip is integrally formed with the main body.

According to one feature, the top surface has a perimeter that defines a shape and the central opening has a shape that is the same as the shape defined by the perimeter of the upper surface.

According to one feature, the top surface has a perimeter that defines a shape and the central opening has a shape that is different than the shape defined by the perimeter of the upper surface.

According to one feature, a width of the main body corresponds substantially to a width of an upper flange of a food container on which the stacking device is disposed.

According to one feature, a length of the main body corresponds substantially to a length of a flange of a food container on which the stacking device is disposed.

According to one feature, the top surface of the main body has a perimeter that corresponds substantially to a perimeter of a flange of a food container on which the stacking device is disposed.

According to one feature, the bottom surface of the main body has a perimeter that corresponds substantially to a perimeter of a flange of a food container on which the stacking device is disposed.

According to one feature, the main body is rectangular.

According to one feature, the main body is square.

According to one feature, the food container stacking device includes a plurality of corner stops extending upward from the top surface of the main body.

According to one feature, wherein four corner stops extend upward from the top surface of the main body.

According to one feature, two corner stops extend upward form the top surface of the main body.

According to one feature, the two corner stops are positioned on adjacent corners of the top surface of the main body.

According to one feature, the two corner stops are positioned on diagonally opposed corners of the top surface of the main body.

According to another aspect of the disclosed technology, a food storage system includes a plurality of food storage pans, the food storage pans each having a base, sidewalls extending upward from the base, and an upper flange extending outward from a top portion of the side walls. A stacking device is disposed between adjacent food storage pans with the food storage pans arranged vertically and in alignment with respect to one another. The stacking device includes a main body having a top surface and a bottom surface, a pair of ends and a pair of sides that define a perimeter of the top surface and the bottom surface; and a lip extending from one end of the main body, the lip being oriented substantially perpendicular to the main body. The main body defines a central opening and a peripheral top support surface and a peripheral bottom support surface between the perimeter and the central opening.

According to another aspect of the disclosed technology, a food container stacking device includes a main body having a top surface, bottom surface and a plurality of sides that define a perimeter of the top surface and the bottom surface; and a lip extending from one side of the main body, the lip being oriented substantially perpendicular to the main body. The main body defines a central opening and a peripheral top support surface and a peripheral bottom support surface between the perimeter and the central opening.

These and further features of the disclosed technology will be apparent with reference to the following description and attached drawings. In the description and drawings, particular embodiments or aspects of the disclosed technology have been disclosed in detail as being indicative of some of the ways in which the principles of the disclosed technology may be employed, but it is understood that the disclosed technology is not limited correspondingly in scope. Rather, the disclosed technology includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, steps or components, but does not preclude the presence or addition of one or more other features, steps, components or groups thereof.

DRAWINGS

These and other features of the disclosed technology, and its advantages, are illustrated specifically in embodiments now to be described, by way of example, with reference to the accompanying diagrammatic drawings.

Figure 1:
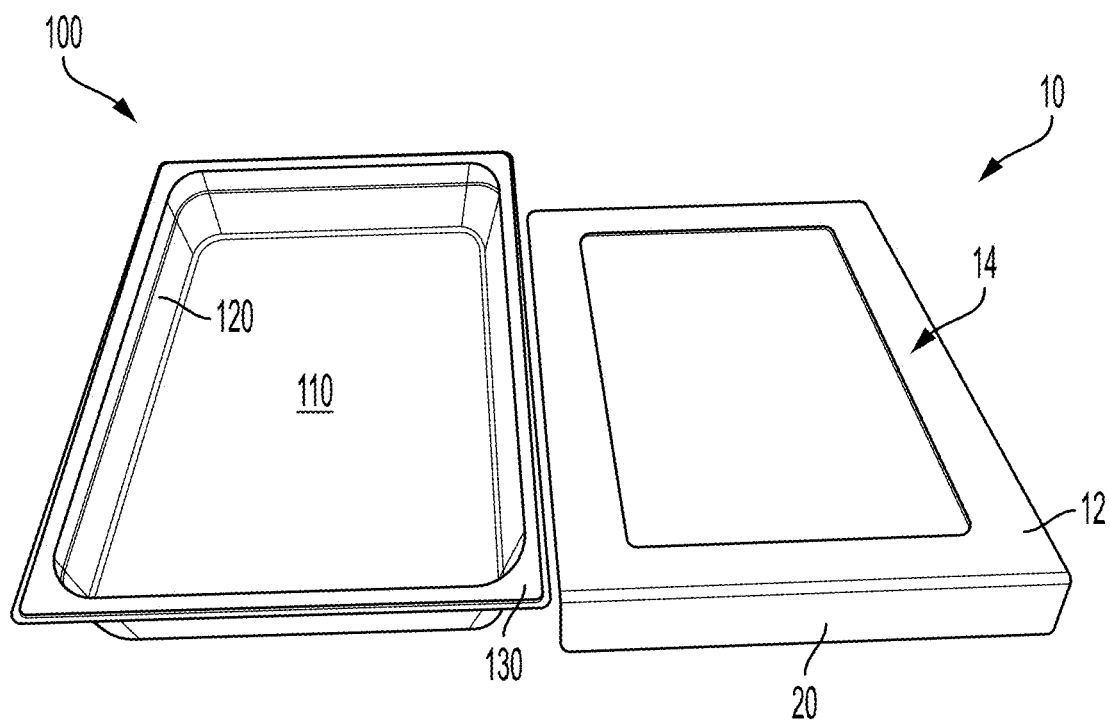
FIG. 1 is a diagrammatic illustration of a food container stacking device in accordance with aspects of the disclosed technology shown together with an example food storage container.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION AND DRAWINGS

The present disclosure recognizes that there are challenges associated with the storage of food storage pans, such as those used in restaurants, institutions and other commercial settings, where large quantities of food are prepared in advance. The food storage pans, which tend to be of standard sizes and configuration throughout the food service industry, cannot be stacked one on top of the other because the bottom of one pan would come into contact with the food in the pan below. The pans may be stacked perpendicularly, but this takes up an excessive amount of space in refrigerators and on countertops, and potentially provides an unstable storage arrangement.

As is described more fully below, aspects of the disclosed technology relate to a food stacking device configured to be employed in connection with food storage containers, such as the food storage pans used in restaurants, institutions and other commercial settings. The stacking device described below provides for the relatively easy vertical arrangement of various sized pans or containers conventionally used in the course of preparation of large quantities of food, especially in commercial settings such as restaurants and institutions, whereby pans may be stacked one above another without the bottom surface of the pan above coming into contact with the contents of the pan below.

The stacking device in accordance with the disclosed technology is adapted for use with commonly found food storage pans already widely used throughout the food service industry. For example, the food storage pans (indicated generally by reference numeral 100 in the drawings described below) can include rectangular, stainless-steel pans, which have four vertical or substantially vertical side walls and an outwardly extending, horizontal flange rim around the upper edge of these walls. During typical restaurant operation and food preparation, these pans can be filled with food in a cooked, partially cooked or uncooked state. The pans are then stored in a food storage location such as on a counter or in a refrigerator. The stacking device described more fully below allows the rectangular pans to be vertically arranged in a space-efficient manner.

It will be appreciated that the stacking device described herein allows for the user to fill food storage pans to a higher level than might otherwise be possible without use of the stacking device. The separation and support provided by the stacking device allows for use of simply foil over the top of respective food storage pans, with the numerous pans being efficiently and securely stacked on top of one another.

With reference to FIG. 1, an exemplary embodiment of a food container stacking device (also referred to herein as a food storage container stacking device or simply as a stacking device) 10 is provided. The food stacking device 10 is shown together with an example food storage container 100. In the illustrated example, the food storage container 100 is a rectangular stainless steel kitchen pan. It will be appreciated that the food container stacking device can be used with other food storage containers without departing from the scope of the disclosed technology. Some food storage pans, such as the example illustrated in FIG. 1, are configured to include a base 110 and sidewalls 120 extending upward from the base. The sidewalls 120 can extend vertically upward and/or they can extend upward such that the sidewalls flare out slightly from the bottom surface such that the opening at the top of the food storage pan has slightly larger dimensions than the dimensions of the bottom surface of the food storage pan. In the illustrated example, the food storage pan includes an upper flange 130 extending outward from a top portion of the sidewalls 120.

The stacking device 10 includes a main body 12 having a top surface 14 and a bottom surface 16. The stacking device 10 includes a pair of ends and a pair of sides that define a perimeter of the top surface 14 and the bottom surface 16.

The stacking device 10 includes a lip (also referred to as an extension member) 20 extending from one end of the main body 12. In accordance with a preferred implementation, the lip 20 is oriented substantially perpendicular to the main body 12. The main body 12 defines or otherwise includes a central opening and a peripheral top support surface and a peripheral bottom support surface between the perimeter and the central opening. In accordance with a preferred implementation, the lip 20 extends downwardly relative to the main body 12 when the stacking device 10 is disposed on an associated food storage container It will be appreciated that the lip 20 can be any suitable height that is less than the height of the food storage pans with which the stacking device is being used. For example, it the stacking device is configured for use with rectangular food storage pans having a depth of 2.5 inches, the lip can be configured to have a height of about 2 inches. In accordance with one implementation, the lip 20 can be configured to have a height of no more than about 80% of a height of a food container on which the stacking device is disposed.

Figure 2:
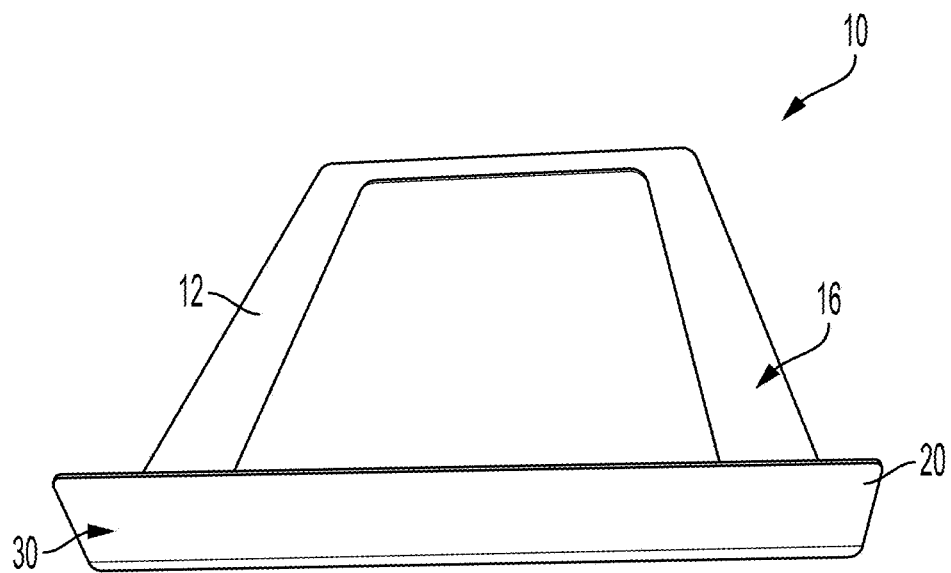
FIG. 2 is an end perspective view of a food container stacking device in accordance with aspects of the disclosed technology.
Figure 3:
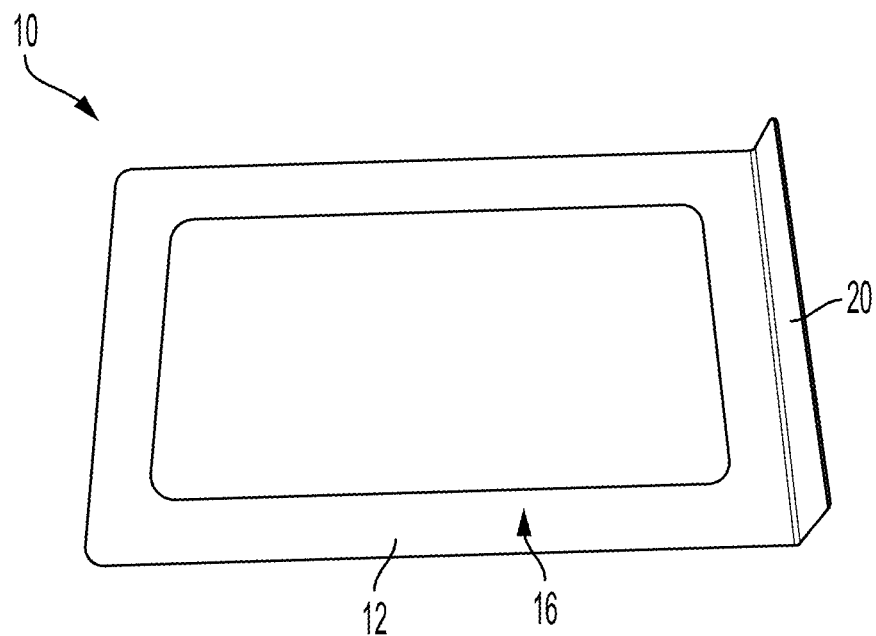
FIG. 3 is a bottom view of a food container stacking device in accordance with aspects of the disclosed technology.
Figure 4:
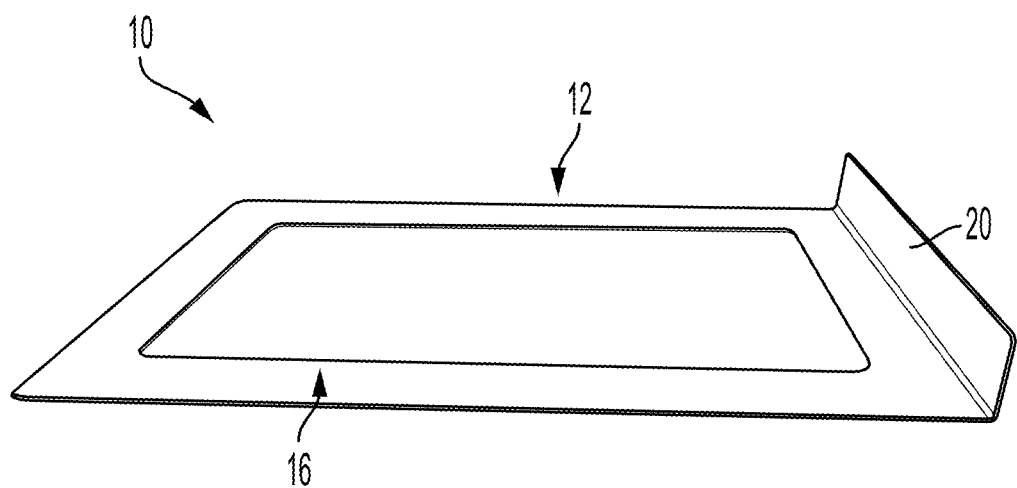
FIG. 4 is a side view of a food container stacking device in accordance with aspects of the disclosed technology.
Figure 5:
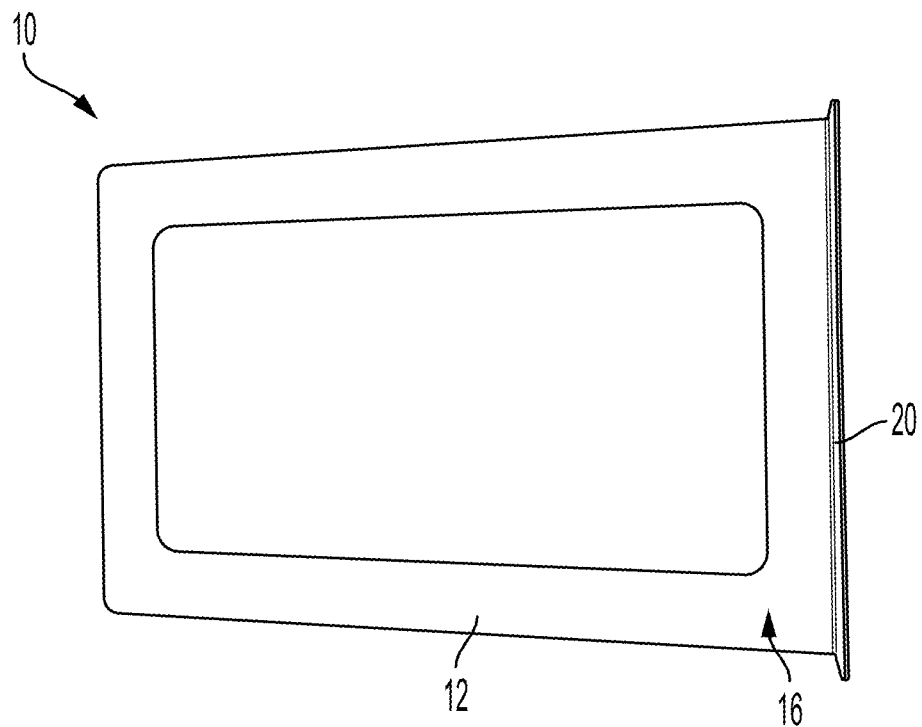
FIG. 5 is a bottom view of a food container stacking device in accordance with aspects of the disclosed technology.
Figure 6:
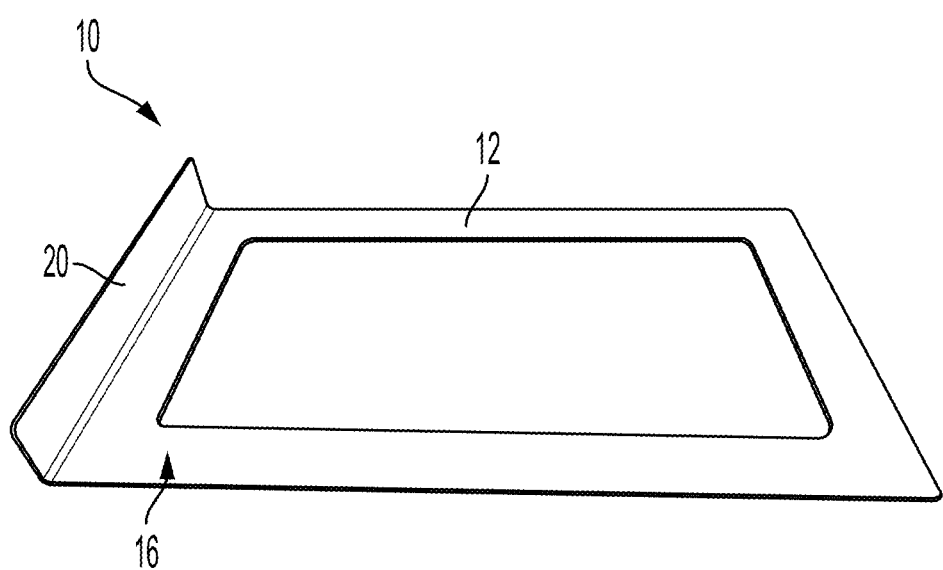
FIG. 6 is a side view of a food container stacking device in accordance with aspects of the disclosed technology.
Figure 7:
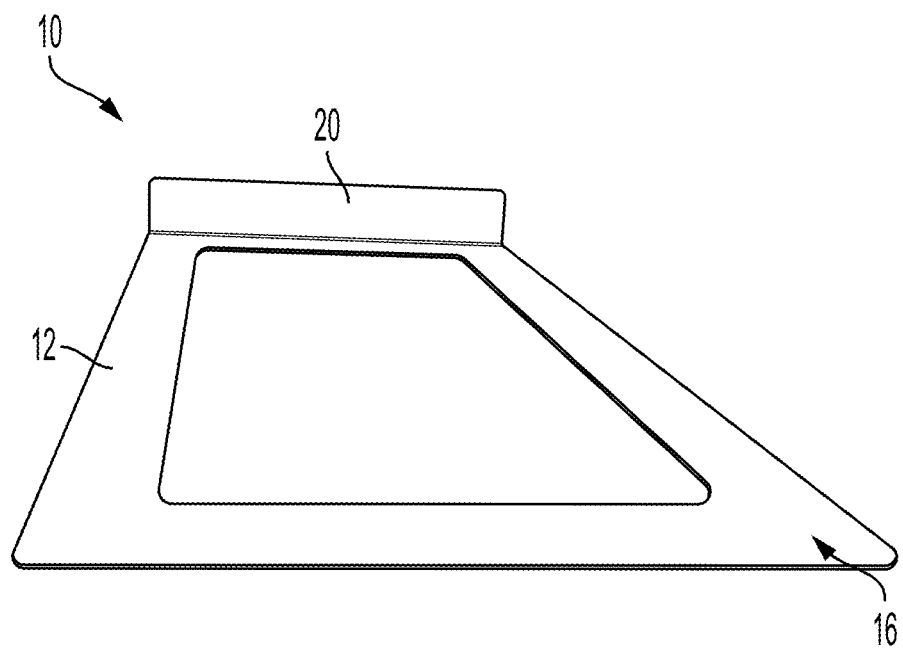
FIG. 7 is an end view of a food container stacking device in accordance with aspects of the disclosed technology.
Figure 8:
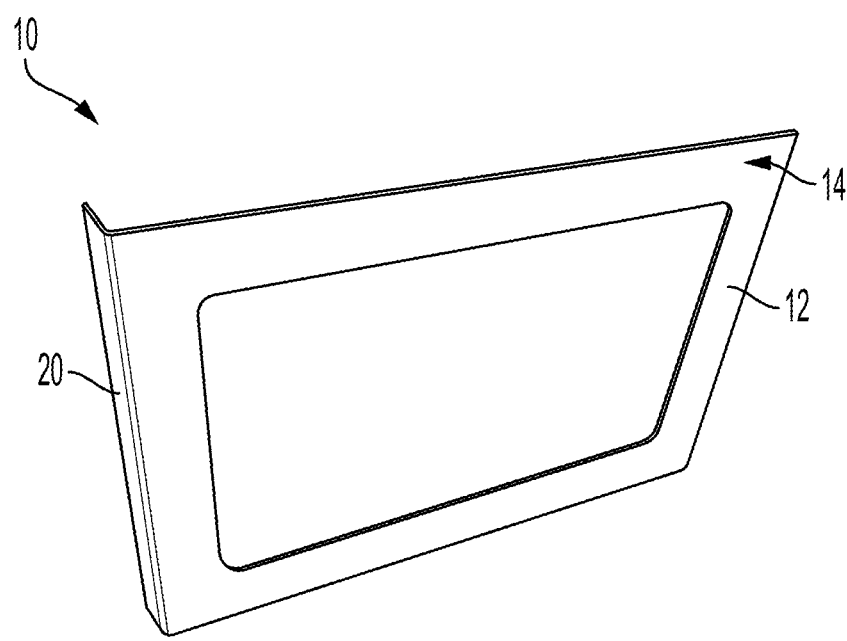
FIG. 8 is a top view of a food container stacking device in accordance with aspects of the disclosed technology.
Figure 17:
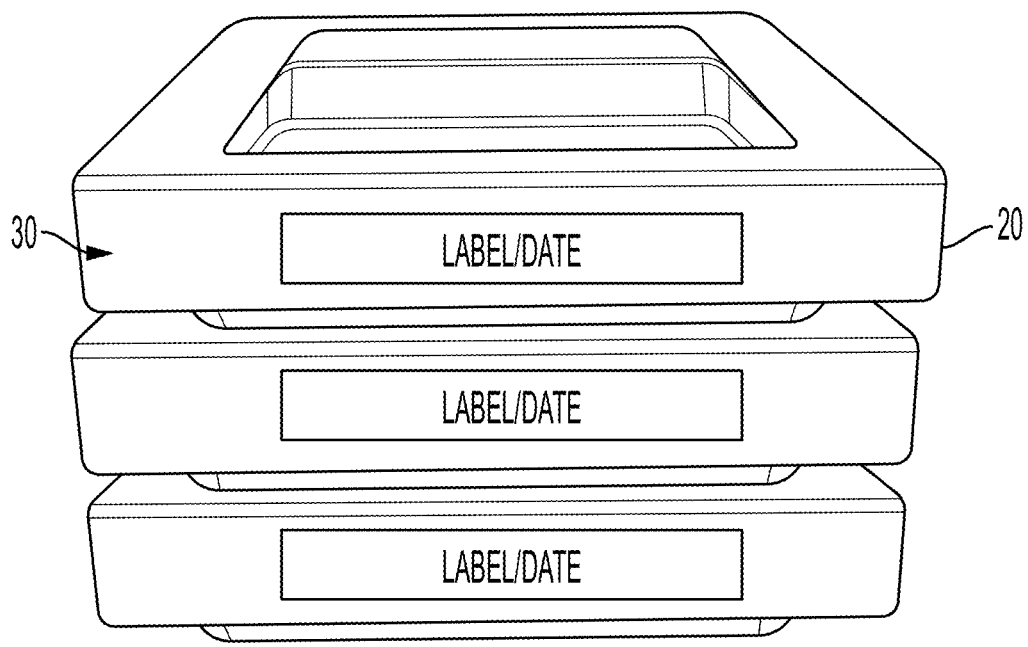
FIG. 17 is an end view of a plurality of food container stacking devices in accordance with aspects of the disclosed technology disposed on a plurality of food storage containers.
Figure 18:
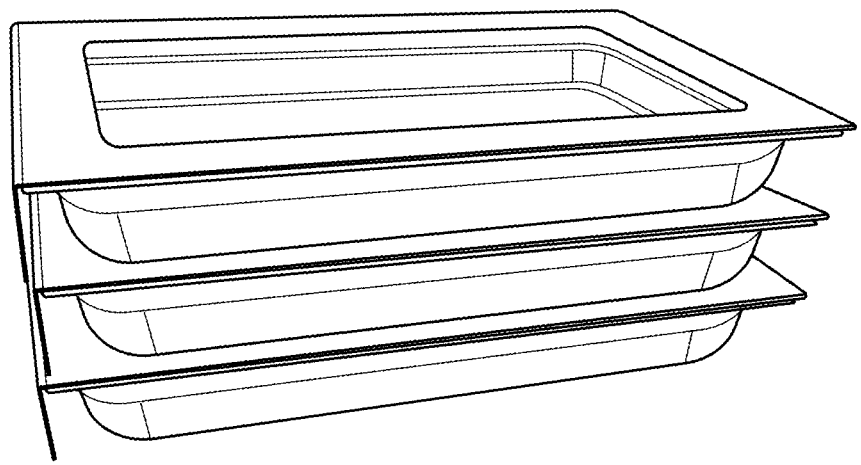
FIG. 18 is a side view of a plurality of food container stacking devices in accordance with aspects of the disclosed technology disposed on a plurality of food storage containers.
Figure 19:
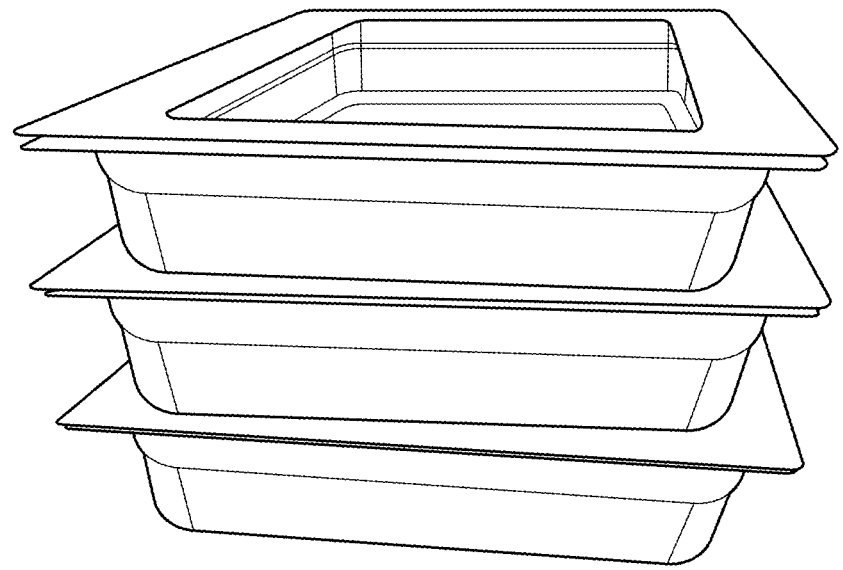
FIG. 19 is an end view of a plurality of food container stacking devices in accordance with aspects of the disclosed technology disposed on a plurality of food storage containers.

As shown in the several figures, including FIG. 2 and FIG. 17, the lip 20 includes an outer surface 30 configured to receive indicia related to contents of a food container on which the stacking device is disposed, such as food storage pan content information, date of preparation, type of food and quantity of food. The indicia can be in the form of information written on tape applied to the outer surface of the lip, or though any other suitable manner. In addition, it will be appreciated that the lip 20 can serve to provide stability and prevent sliding of the stacking device through mechanical interference when it is positioned between adjacent pans.

Figure 20:
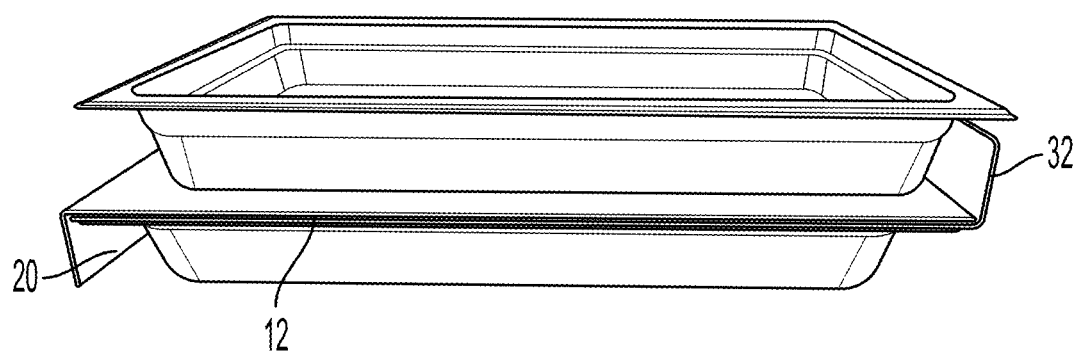
FIG. 20 is a side view of a food container stacking device in accordance with another example aspect of the disclosed technology.
Figure 21:
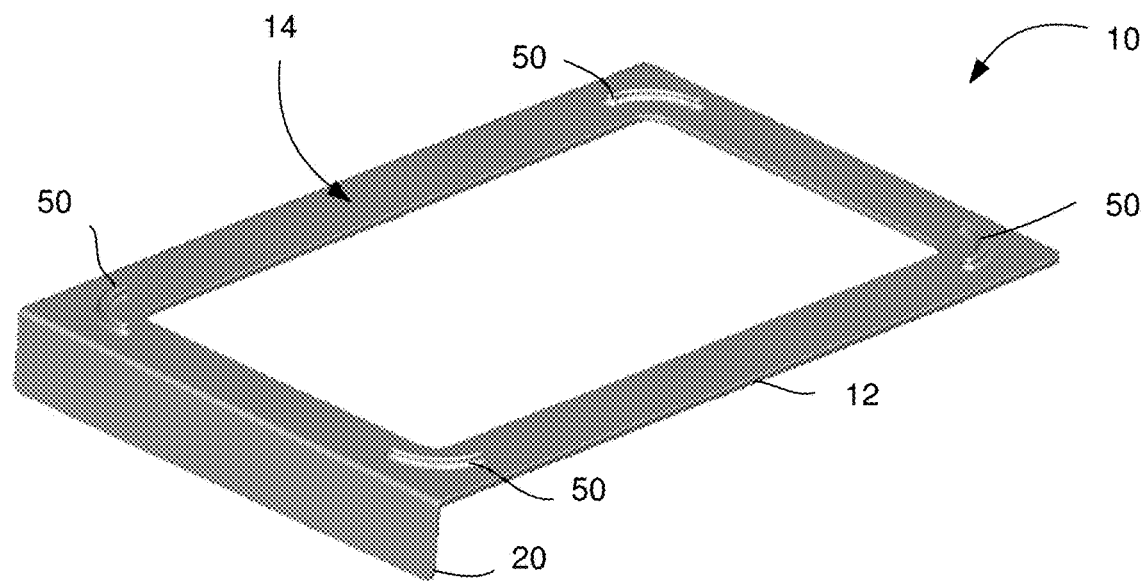
FIG. 21 is a perspective view of a food container stacking device in accordance with another example aspect of the disclosed technology.
Figure 22:
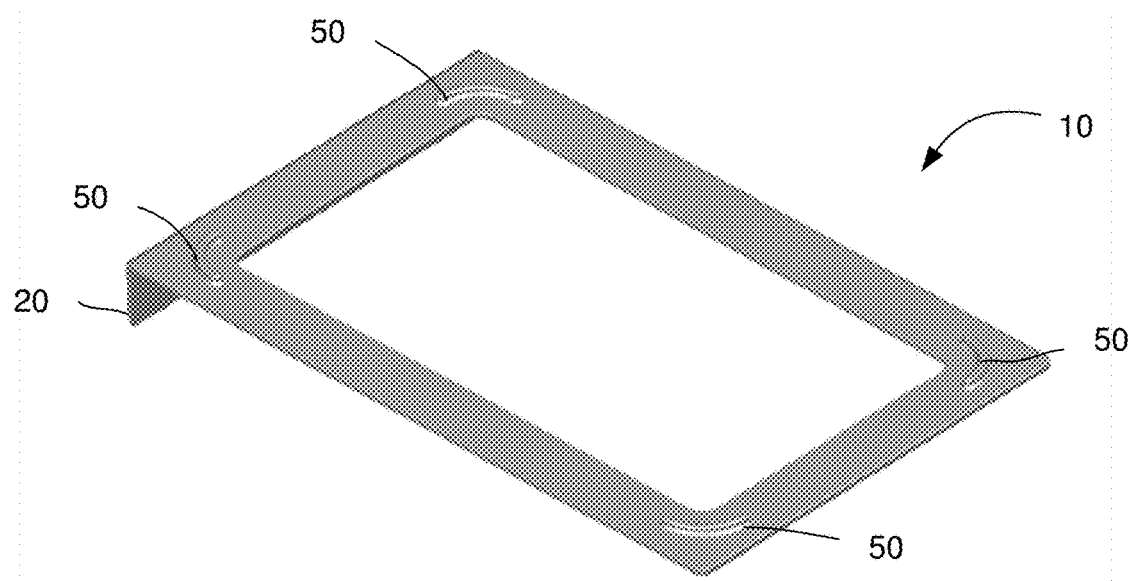
FIG. 22 is a perspective view of a food container stacking device in accordance with another example aspect of the disclosed technology.
Figure 23:
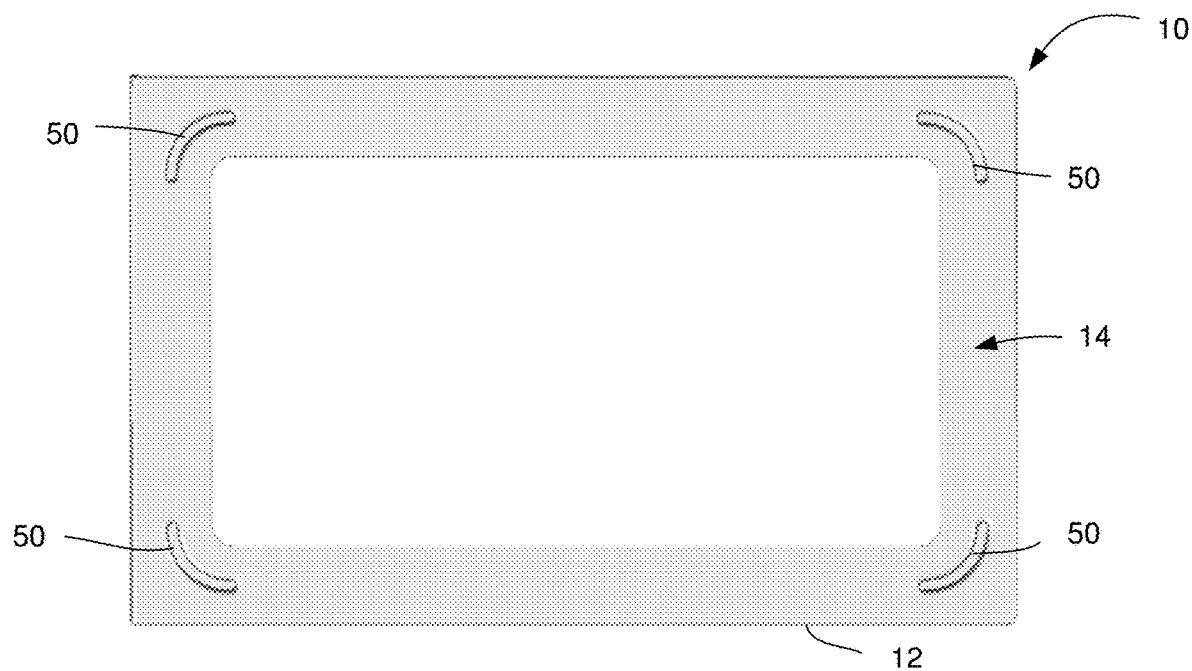
FIG. 23 is a top view of a food container stacking device in accordance with another example aspect of the disclosed technology.
Figure 24:
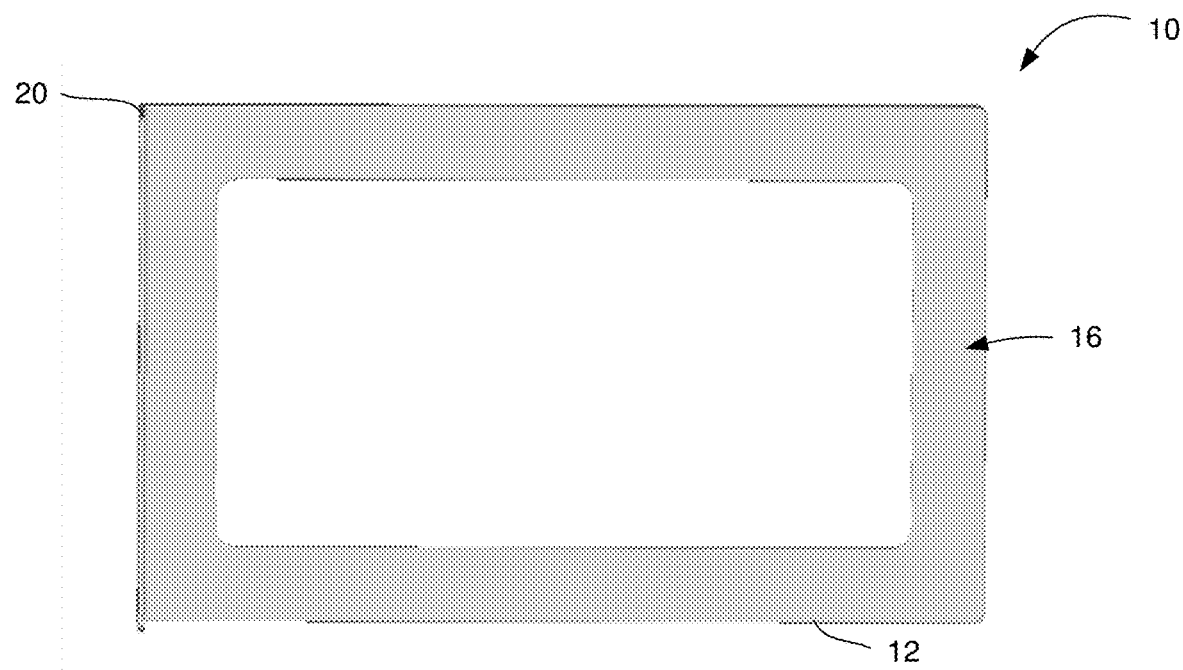
FIG. 24 is a bottom view of a food container stacking device in accordance with another example aspect of the disclosed technology.
Figure 25:
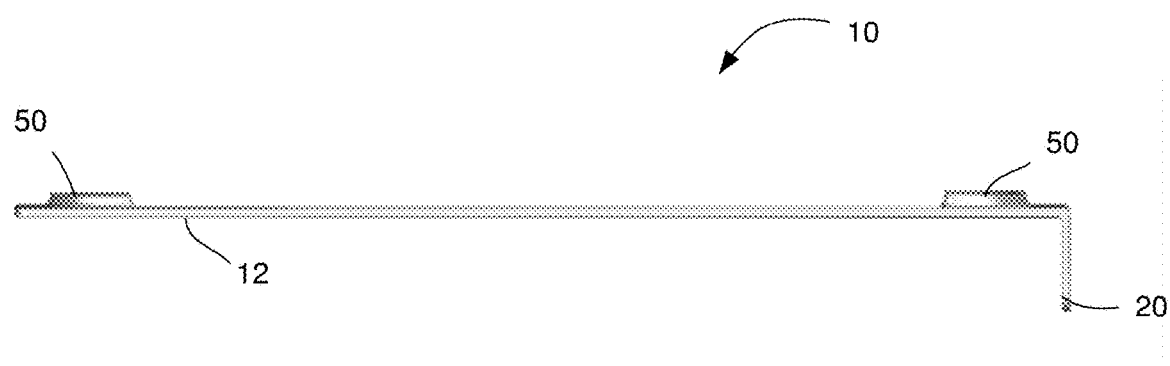
FIG. 25 is a side view of a food container stacking device in accordance with another example aspect of the disclosed technology.
Figure 26:
FIG. 26 is a side view of a food container stacking device in accordance with another example aspect of the disclosed technology.
Figure 27:
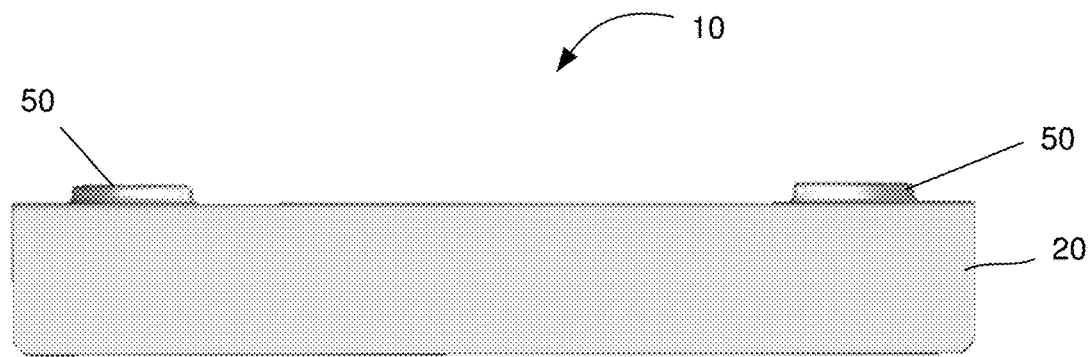
FIG. 27 is a front view of a food container stacking device in accordance with another example aspect of the disclosed technology.
Figure 28:
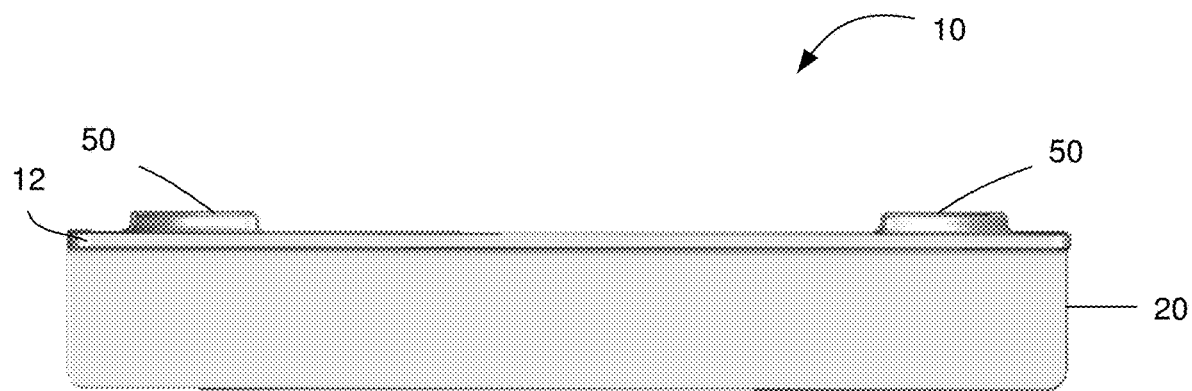
FIG. 28 is a rear view of a food container stacking device in accordance with another example aspect of the disclosed technology.

While the stacking device has been described with respect to a lip 20 extending from one end of the main body 12, it will be appreciated that other configurations can be employed without departing from the scope of the disclosed technology. For example, the stacking device can include a pair of lips extending from opposite ends of the main body. In accordance with one example implementation the pair of lips extending from opposite ends of the main body can both extend downwardly from the main body. In accordance with another example implementation illustrated in FIG. 20, the stacking device can include a downwardly extending lip 20 extending from one end of the main body 12 and an upwardly extending lip 32 extending from the other end of the main body 12.

In accordance with another example embodiment, the stacking device can include a lip extending from one side of the main body. In accordance with yet another example embodiment, the stacking device can include a pair of lips or extension members extending from opposite sides of the main body. In accordance with yet another example embodiment, the stacking device can include lips or extension members extending from both ends and both sides of the main body.

While the stacking device has been described as including at least one lip/extension member extending from at least one end and/or side of the main body, it will be appreciated that the stacking device can be configured with a main body, as has been described above, including a peripheral support surface, but without at least one lip/extension member extending from at least one end and/or side of the main body.

It will be appreciated that the stacking device can be configured in a number of sizes and geometries without departing from the scope of the disclosed technology. As is discussed more fully below, the stacking device will be configured to have a perimeter that corresponds substantially to a perimeter defined by the upper flange of the food storage pans with which the stacking device is being used. For example, the stacking device can be configured to have a width of about 13 inches and a length of about 21 inches to correspond substantially to the dimensions of an upper flange associated with an example food storage pan. In accordance with one example embodiment, the stacking device will have a perimeter that is about the same as the perimeter defined by the upper flange of the food storage pans with which the stacking device is being used. In accordance with another example embodiment, the stacking device will have a perimeter that is slightly larger than the perimeter of the food storage pans with which the stacking device is being used. For example, in accordance with one example embodiment, the stacking device can have a length and a width that are each about ⅛ inch larger than the length and width of the upper flange of the food storage pans with which the stacking device is being used. In accordance with another example embodiment, the stacking device can have a length and a width that are each about ¼ inch larger than the length and width of the upper flange of the food storage pans with which the stacking device is being used. In accordance with another example embodiment, the stacking device can have a length and a width that are each about ½ inch larger than the length and width of the upper flange of the food storage pans with which the stacking device is being used.

It will be appreciated that the stacking device can be made of numerous materials without departing from the scope of the disclosed technology. For example, the stacking device can be made of a plastic or polymer material suitable for use in a kitchen setting, formed for example, using an injection molding process. The stacking device can also be made of stainless steel or another suitable metal. While the example embodiment shown in the figures has a generally smooth upper surface, and a generally smooth bottom surface, it will be appreciated that the top surface and/or the bottom surface may be textured. A textured top and/or bottom surface could aid in preventing sliding of adjacent kitchen pans disposed above and below a given stacking device.

In accordance with one preferred implementation, the food container stacking device can be made of a suitable poly-carbonate material that is durable and allows for usage within a wide temperature range (e.g., a range of approximately −40 degrees to about 225 degrees Fahrenheit). In such a construction, it is contemplated that the food container stacking device will be suitable and safe for use in commercial dishwashers.

While aspects of the disclosed technology have been described primarily with respect to rectangular food storage pans, it will be appreciated that the disclosed technology may be employed with pans having other geometries. For example, the stacking device can be configured to have a main body that is square or circular.

Figure 29:
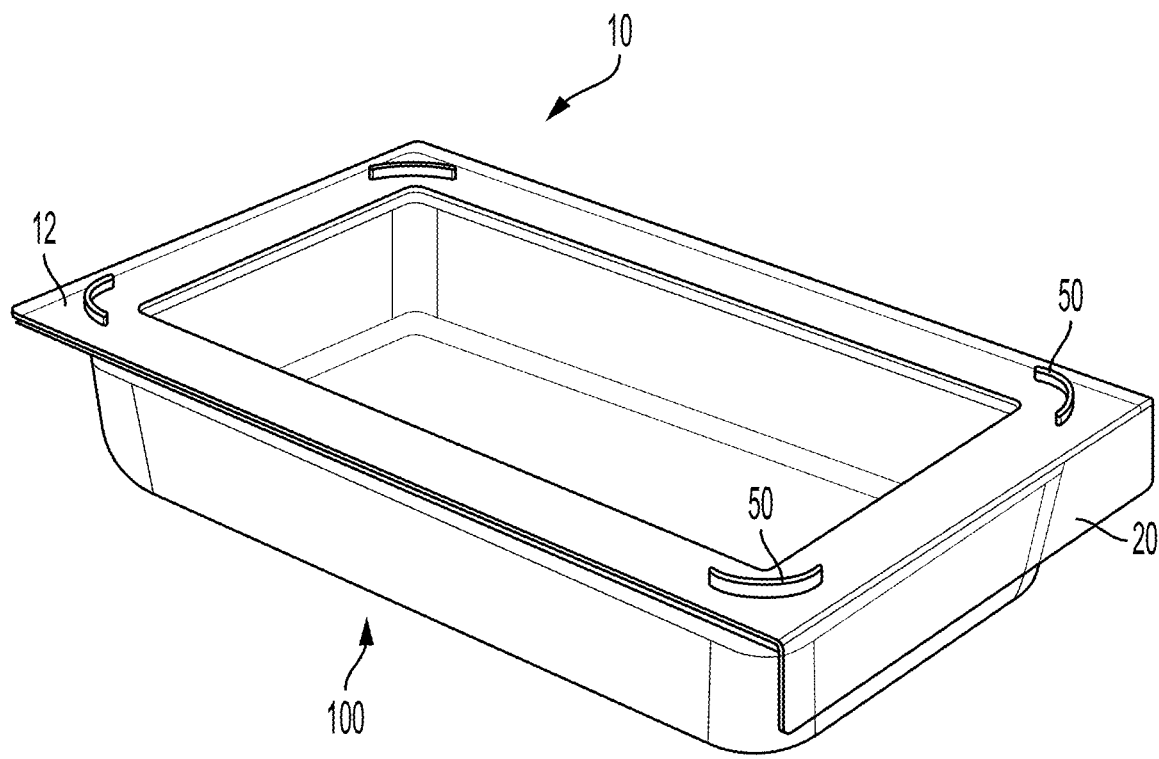
FIG. 29 is a perspective view of a food container stacking device in accordance with one example aspect and configuration of the disclosed technology disposed on a food storage container.
Figure 30:
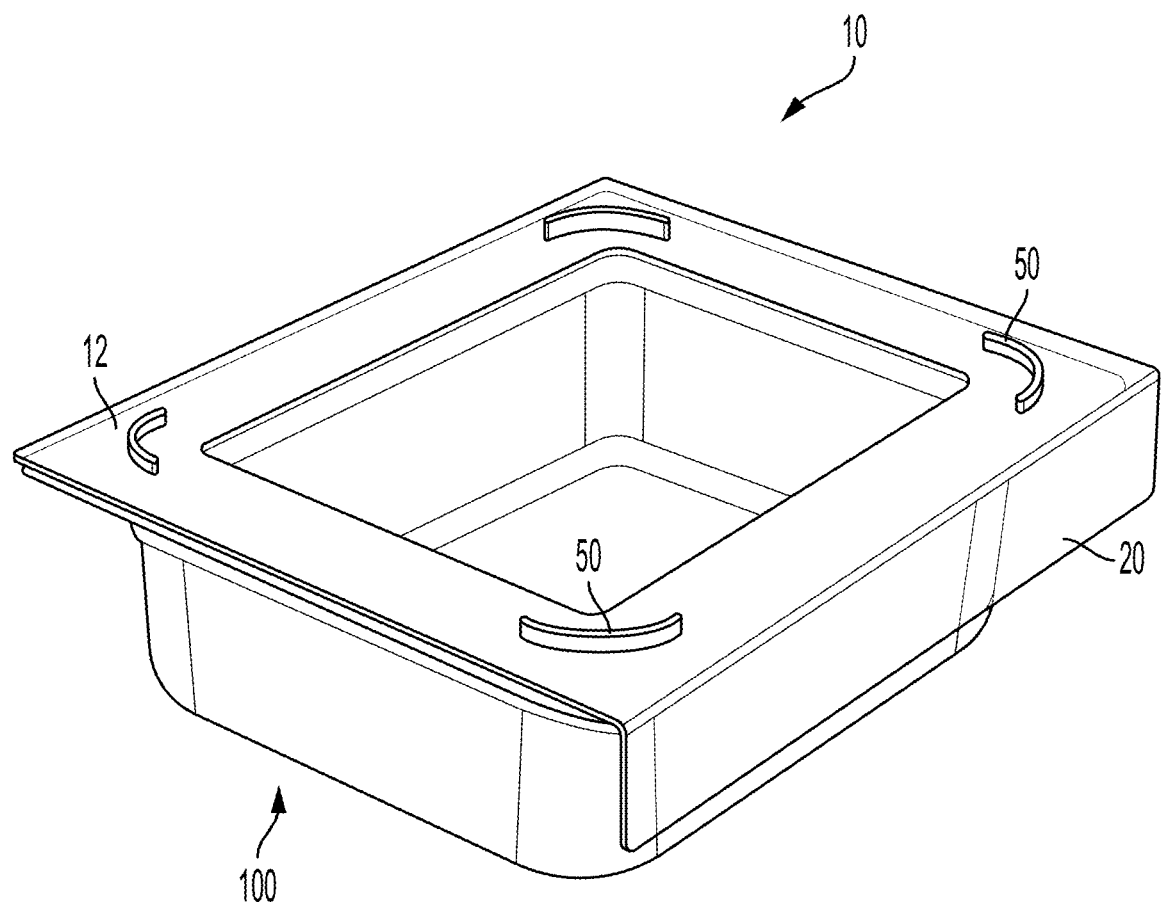
FIG. 30 is a perspective view of a food container stacking device in accordance with another example aspect and configuration of the disclosed technology disposed on a food storage container.
Figure 31:
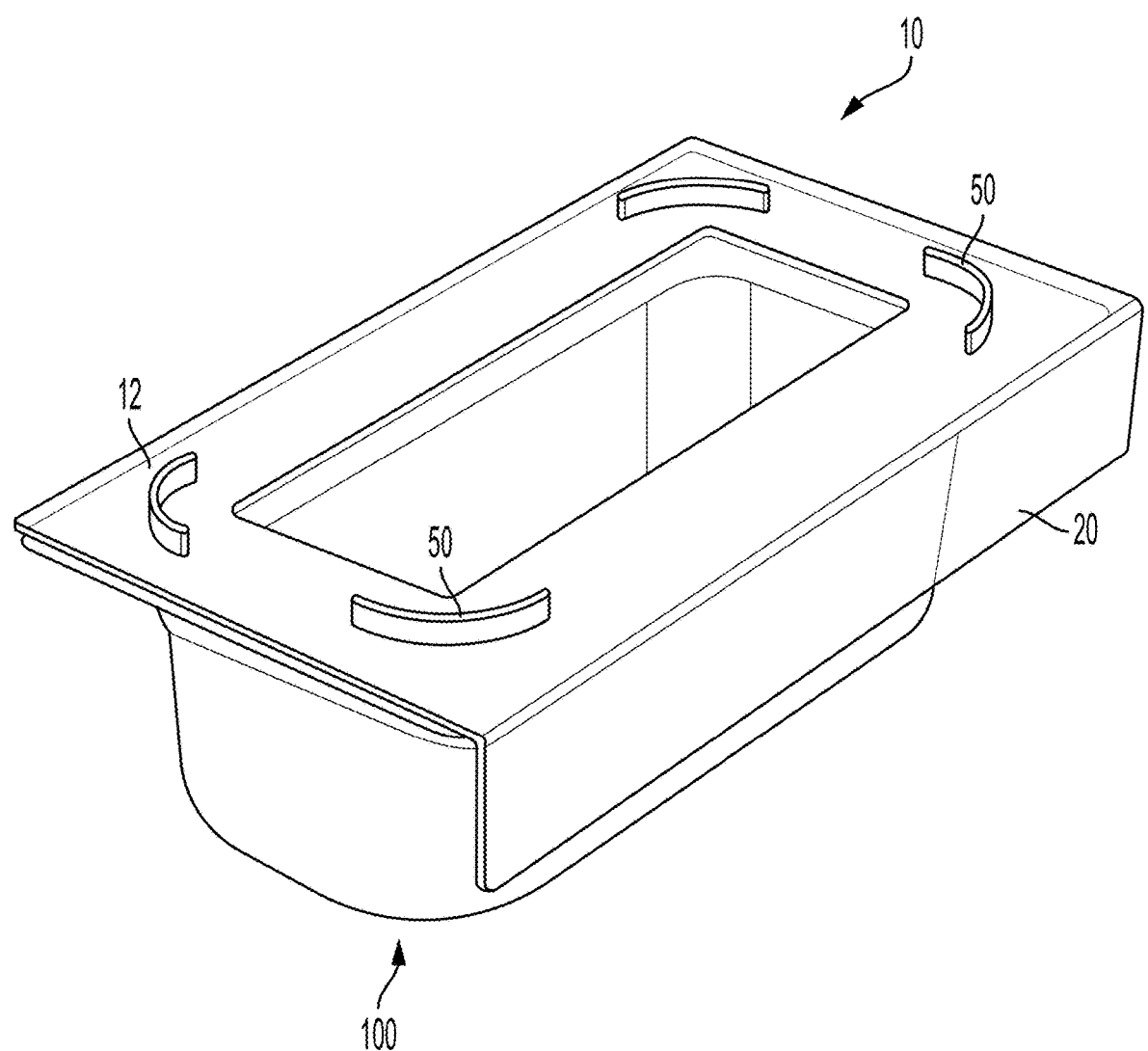
FIG. 31 is a perspective view of a food container stacking device in accordance with another example aspect and configuration of the disclosed technology disposed on a food storage container.

It will be appreciated that the food container stacking device can have a number of different sizes and/or dimensions without departing from the scope of the disclosed technology. For example, the food container stacking device can be sized for use with a standard full-size food storage pan (see, for example, FIG. 29), a standard half-size food storage pan (see, for example, FIG. 30), or a standard one-third-size food storage pan (see, for example, FIG. 31).

In accordance with one implementation, the central opening of the stacking device has the same shape as the shape of the top surface defined by the perimeter of the main body (e.g., rectangular in the illustrated embodiments).

The top peripheral support surface and the bottom peripheral support surface are sized to provide sufficient support and disperse weight of upper food storage containers. The bottom peripheral support surface is supported or otherwise disposed on the flange rim of a lower food storage container, while the central opening and the upper peripheral support surface is sized and configured to support a bottom portion of a food storage pan positioned above the stacking device. For example, in an embodiment where the upper flange of the associated food storage container has dimensions of about 21 inches by about 13 inches (and the main body of the stacking device has dimensions that correspond substantially with the dimensions of the upper flange) the central opening can be sized to be about 17.25 inches by about 9.25 inches. In accordance with this example embodiment, the peripheral support surface has a substantially uniform width of about 1.9 inches. It will be appreciated that other dimensions can be employed without departing from the scope of the disclosed technology. The central opening and peripheral support surface can be sized to prevent the base of a food storage container disposed on the top peripheral support surface of the stacking device from slipping into the central opening.

In accordance with one example embodiment, the central opening and peripheral support surface can be sized such that a ratio of the area of the central opening to the area defined by the perimeter of the main body would be no more than about 58%. In accordance with another example embodiment, the central opening and the peripheral support surface can be sized such that a ratio of the area of the central opening to the area defined by the perimeter of the main body would be no more than about 68%. It will be appreciated that this ratio could fall within a range of about 0% to about 68% without departing from scope of the disclosed technology.

It will be appreciated that the stacking device will have a thickness that is sufficient to provide the rigidity to support one or more food storage containers stacked thereon.

Figure 9:
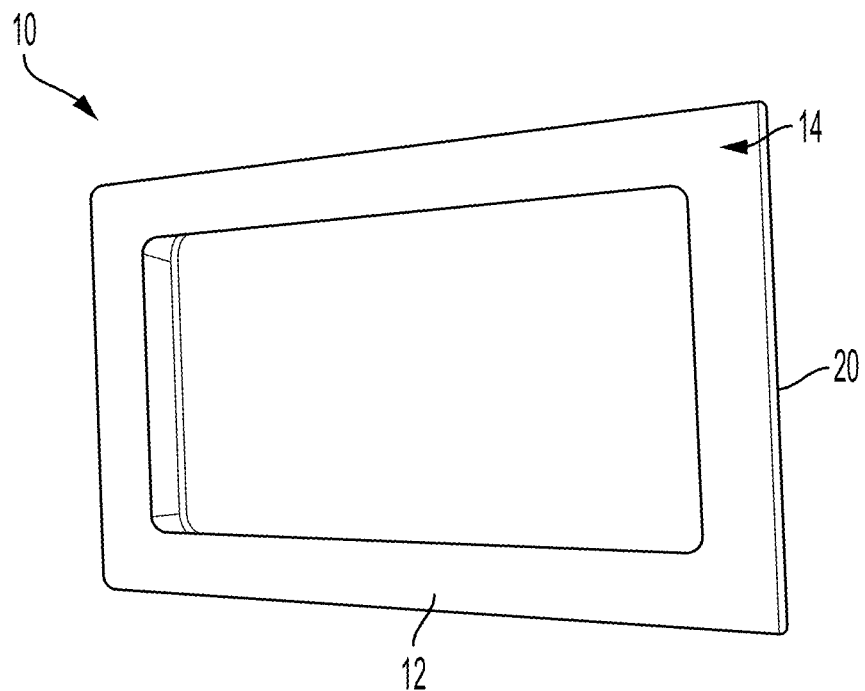
FIG. 9 is a top view of a food container stacking device in accordance with aspects of the disclosed technology disposed on a food storage container.
Figure 10:
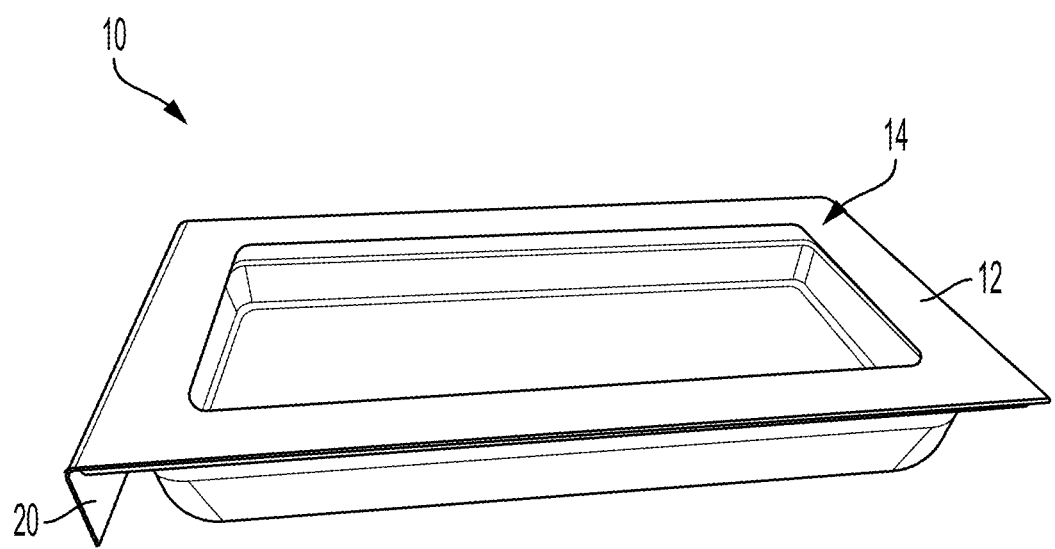
FIG. 10 is a side view of a food container stacking device in accordance with aspects of the disclosed technology disposed on a food storage container.
Figure 11:
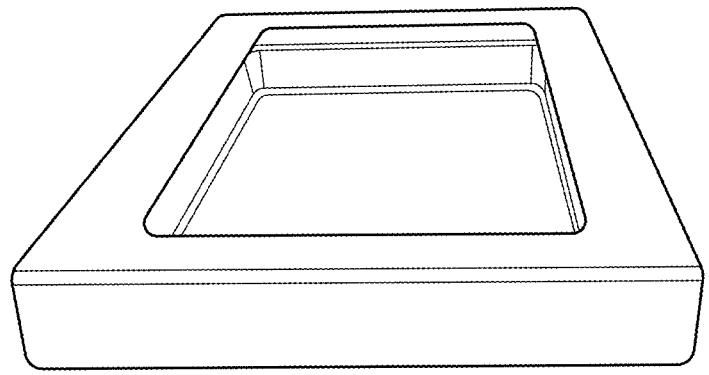
FIG. 11 is an end view of a food container stacking device in accordance with aspects of the disclosed technology disposed on a food storage container.
Figure 12:
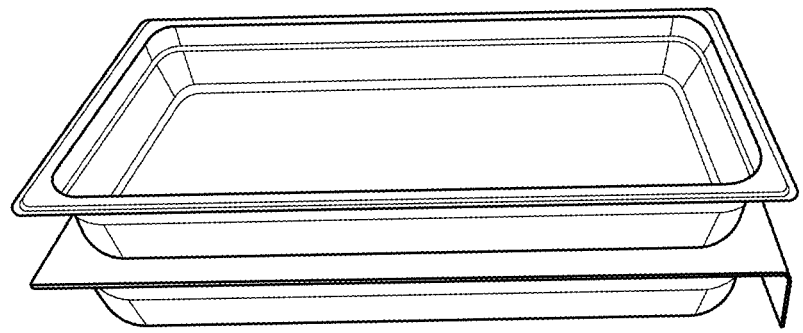
FIG. 12 is a side view of a food container stacking device in accordance with aspects of the disclosed technology disposed between a pair of food storage containers.
Figure 13:
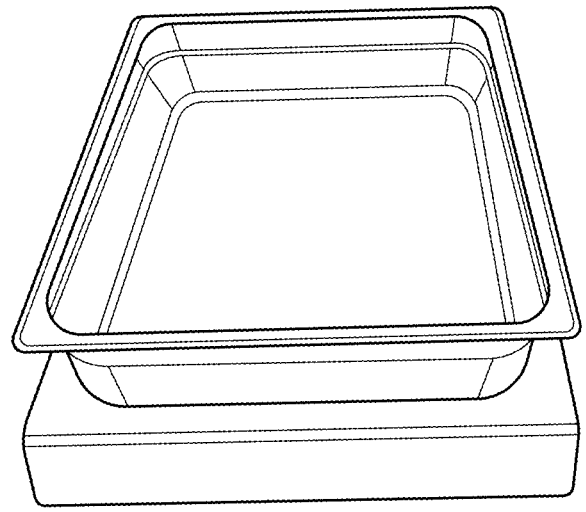
FIG. 13 is an end view of a food container stacking device in accordance with aspects of the disclosed technology disposed between a pair of food storage containers.
Figure 14:
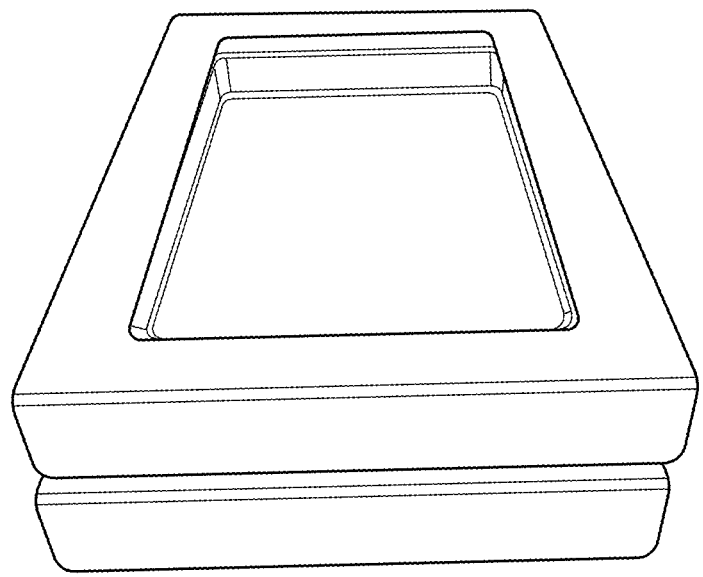
FIG. 14 is an end view of a pair of food container stacking devices in accordance with aspects of the disclosed technology disposed on a pair of food storage containers.
Figure 15:
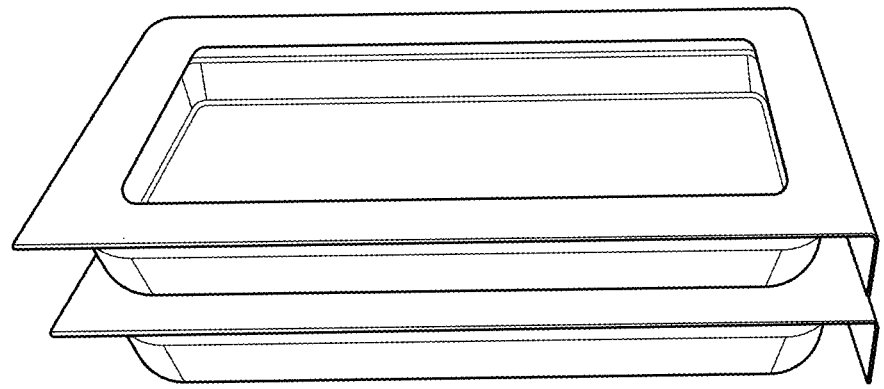
FIG. 15 is a side view of a pair of food container stacking devices in accordance with aspects of the disclosed technology disposed on a pair of food storage containers.
Figure 16:
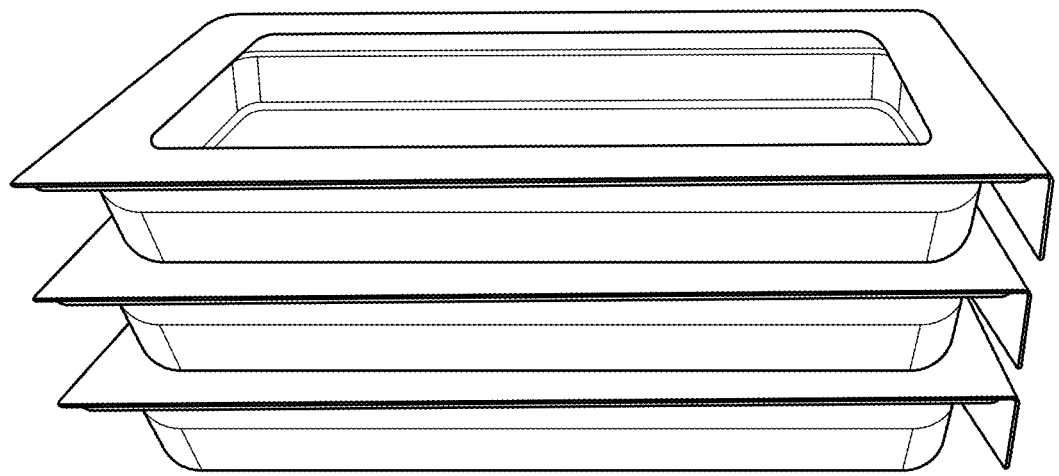
FIG. 16 is a side view of a plurality of food container stacking devices in accordance with aspects of the disclosed technology disposed on a plurality of food storage containers.

Referring now to FIGS. 9-19, the food storage container stacking device 10 is shown in operation together with food storage pans (indicated generally by reference numeral 100). FIGS. 9-11 illustrate a first food storage pan with a first stacking device positioned on top of the first food storage pan. As described above, the first stacking device is positioned on the first food storage pan such that the perimeter of the food stacking pan is generally aligned with the perimeter of the upper flange of the first food stacking pan. As shown in FIGS. 12-13, a second food storage pan is positioned on the first stacking device. The second food storage pan is positioned on the first stacking device such that the bottom surface of the second food storage pan is generally centered on the first food stacking device with the bottom surface of the second storage pan disposed over the center opening defined by the first stacking device. FIGS. 14-15 illustrate a second stacking device disposed on top of the second food storage pan. FIGS. 16-19 illustrate an example where a third food storage pan is positioned on top of the second stacking device, and a third stacking device is disposed on the upper flange of the third food storage pan.

Referring now to FIGS. 21-28, aspects of the disclosed technology are illustrated in connection with an example embodiment of a food container stacking device in which the top surface of the main body includes or otherwise defines a plurality of corner stops (also referred to as support ribs, support ridges and/or indexing features) 50 extending upward from the top surface of the main body. It will be appreciated that the corner stops are positioned on the top surface of the main body to correspond with corners of a food storage container positioned on or otherwise supported by the top surface. In the illustrated example embodiment, the top surface includes or otherwise defines four corner stops 50. It will be appreciated that the top surface can be configured to define two corners stops without departing from the scope of the disclosed technology. In this example embodiment, the two corner stops 50 can be positioned on adjacent corners along a short dimension of the main body, adjacent corners along a long dimension of the main body, and/or corners disposed diagonally from one another.

The corner stops can be sized and configured in a number of different ways without departing from the scope of the disclosed technology. In the illustrated embodiment, the corner stops are configured with a generally smooth curve that corresponds generally to the contour of the corners of a lower portion of a food storage container positioned on or otherwise supported by the top surface of the food container stacking device. It will be appreciated that the corner stops can have any suitable height and thickness without departing from the scope of the disclosed technology. For example, the corner stops can be configured to have a height corresponding approximately to the thickness of the main body of the food container stacking device. In a preferred implementation, the corner stops are integrally formed with the main body of the food container stacking device.

In addition to the lip described above, it will be appreciated that the food container stacking device can be configured to include other indicia of the contents of the food storage pans on which the food container stacking device is positioned. For example, the food container stacking device can be manufactured in a variety of colors to indicate the contents of the food storage pans on which the food container stacking device is positioned. In accordance with one example, the food container stacking device can be manufactured of a suitable polycarbonate material that is clear or otherwise translucent to indicate prepared foods, blue to indicate fish and seafood, green to indicate produce, red to indicate raw meat, purple to indicate allergens, and yellow to indicate raw poultry. It will be appreciated that other color options can be selected without departing from the scope of the disclosed technology. It will be further appreciated that this color-coding methodology can allow a user to avoid cross-contamination when the food container stacking devices are being used with food storage pans having different types of classes of food.

It will be appreciated that the configuration of the stacking device described herein provides the advantage of relatively compact storage of a large number of vertically-arranged food storage containers. The number of food storage pans that can be vertically stacked largely will depend on the size of the storage space for the food storage containers. It is contemplated that the stacking device configuration could allow for compact vertical stacking of up to a dozen food storage containers.

The stacking device described herein allows for the user to fill food storage pans to a higher level than might otherwise be possible without use of the stacking device. The separation and support provided by the stacking device allows for use of simply foil over the top of respective food storage pans, with the numerous pans being efficiently and securely stacked on top of one another. It will be appreciated that the stacking device allows for food storage pans to be filled with a greater amount of food because the food stacking device prevents an upper food storage pan to impinge on a lower food storage pan.

Although the disclosed technology has been shown and described with respect to a certain preferred aspect, embodiment or embodiments, it is obvious that equivalent alterations and modifications will occur to others skilled in the art upon the reading and understanding of this specification and the annexed drawings. In particular regard to the various functions performed by the above described elements (components, assemblies, devices, members, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary aspect, embodiment or embodiments of the disclosed technology. In addition, while a particular feature of the disclosed technology may have been described above with respect to only one or more of several illustrated aspects or embodiments, such feature may be combined with one or more other features of the other embodiments, as may be desired and advantageous for any given or particular application.

What is claimed is:

1. A food container stacking device comprising:
a main body having a top surface and a bottom surface, a pair of ends and a pair of sides that define a perimeter of the top surface and the bottom surface; and
a lip extending from one end of the main body, the lip being oriented substantially perpendicular to the main body;
wherein the main body defines a central opening and a peripheral top support surface and a peripheral bottom support surface between the perimeter and the central opening;
wherein the perimeter and the central opening are sized to facilitate stacking of associated nestable identical food containers such that a first such associated food container may be securely supported on and entirely above a second such associated food container when stacked vertically and in alignment with respect to one another and in the same orientation with respect to one another;
wherein the food container stacking device is a single piece of material; and
wherein the stacking device does not extend into either the first such associated food container or the second such associated food container when stacked with the first such associated food container securely supported on and entirely above the second such associated food container when stacked vertically and in alignment with respect to one another and in the same orientation with respect to one another;
wherein the food container stacking device is operationally engaged with a food container; and wherein the food container stacking device further comprises a set of corner stops extending upward from the top surface of the main body to correspond with corners of the food container when positioned on or otherwise supported by the top surface.

2. The food container stacking device of claim 1, wherein the peripheral top and bottom support surfaces have an approximately uniform width.

3. The food container stacking device of claim 1, the perimeter of the top and bottom surfaces of the main body corresponds substantially with an associated perimeter of an associated upper flange rim of an associated food container with which the stacking device is adapted to be operationally engaged.

4. The food container stacking device of claim 1, wherein the central opening has a perimeter that is smaller than an associated perimeter of an associated food container with which the stacking device is adapted to be operationally engaged.

5. The food container stacking device of claim 1, wherein the lip extends downwardly relative to the main body.

6. The food container storage device of claim 5, wherein the lip has a height no more than about 80% of an associated height of an associated food container with which the stacking device is adapted to be operationally engaged.

7. The food container stacking device of claim 5, wherein the lip includes an outer surface configured to receive indicia related to associated contents of an associated food container with which the stacking device is adapted to be operationally engaged.

8. The food container stacking device of claim 1, wherein the lip is integrally formed with the main body.

9. The food container stacking device of claim 1, wherein the top surface has a perimeter that defines a shape and the central opening has a shape that is the same as the shape defined by the perimeter of the upper surface.

10. The food container stacking device of claim 1, wherein the top surface has a perimeter that defines a shape and the central opening has a shape that is different than the shape defined by the perimeter of the upper surface.

11. The food container stacking device of claim 1, wherein a width of the main body corresponds substantially to an associated width of an associated flange of an associated food container with which the stacking device is adapted to be operationally engaged.

12. The food container stacking device of claim 1, wherein a length of the main body corresponds substantially to an associated length of an associated flange of an associated food container with which the stacking device is adapted to be operationally engaged.

13. The food container stacking device of claim 1, wherein the top surface of the main body has a perimeter that corresponds substantially to an associated perimeter of an associated flange of an associated food container with which the stacking device is adapted to be operationally engaged.

14. The food container stacking device of claim 1, wherein the bottom surface of the main body has a perimeter that corresponds substantially to an associated perimeter of an associated flange of an associated food container with which the stacking device is adapted to be operationally engaged.

15. The food container stacking device of claim 1, wherein the main body is rectangular.

* * * * *